US008625772B2

(12) United States Patent
Kulkarni

(10) Patent No.: US 8,625,772 B2
(45) Date of Patent: Jan. 7, 2014

(54) INTEGRATED TESTING PLATFORM FOR CONTACT CENTRES

(75) Inventor: Alok Kulkarni, Glen Iris (AU)

(73) Assignee: Cyara Solutions Pty Ltd., Melbourne (AU)

(*) Notice: Subject to any disclaimer, the term of this patent is extended or adjusted under 35 U.S.C. 154(b) by 970 days.

(21) Appl. No.: 12/644,343

(22) Filed: Dec. 22, 2009

(65) Prior Publication Data

US 2011/0150189 A1 Jun. 23, 2011

(51) Int. Cl.
*H04M 3/00* (2006.01)
*H04M 3/42* (2006.01)

(52) U.S. Cl.
USPC .................. 379/265.02; 379/201.02

(58) Field of Classification Search
USPC ....................................... 379/265.06
See application file for complete search history.

(56) References Cited

U.S. PATENT DOCUMENTS

| | | | | |
|---|---|---|---|---|
| 5,206,903 A | * | 4/1993 | Kohler et al. | 379/265.12 |
| 5,825,869 A | * | 10/1998 | Brooks et al. | 379/265.12 |
| 6,128,380 A | * | 10/2000 | Shaffer et al. | 379/265.01 |
| 6,163,607 A | * | 12/2000 | Bogart et al. | 379/266.01 |
| 6,771,765 B1 | * | 8/2004 | Crowther et al. | 379/265.09 |
| 8,054,965 B1 | * | 11/2011 | Wu et al. | 379/265.11 |
| 2004/0202308 A1 | * | 10/2004 | Baggenstoss et al. | 379/265.06 |
| 2005/0165930 A1 | * | 7/2005 | Whitman, Jr. | 709/226 |
| 2005/0238161 A1 | * | 10/2005 | Yacoub et al. | 379/265.06 |
| 2006/0072739 A1 | * | 4/2006 | Baggenstoss et al. | 379/265.05 |
| 2006/0133594 A1 | * | 6/2006 | Neyman et al. | 379/221.14 |
| 2006/0221941 A1 | * | 10/2006 | Kishinsky et al. | 370/352 |
| 2006/0233121 A1 | * | 10/2006 | Cooper | 370/261 |
| 2006/0233346 A1 | * | 10/2006 | McIlwaine et al. | 379/265.02 |
| 2006/0256953 A1 | * | 11/2006 | Pulaski et al. | 379/265.06 |
| 2007/0121824 A1 | * | 5/2007 | Agapi et al. | 379/88.18 |
| 2007/0201679 A1 | * | 8/2007 | Baggenstoss et al. | 379/265.06 |

* cited by examiner

*Primary Examiner* — Joseph T Phan
(74) *Attorney, Agent, or Firm* — Galvin Patent Law LLC; Brian R. Galvin

(57) ABSTRACT

A contact center (120) is desirably tested for operating performance by simulating calls in the contact center (120) in an automated manner. Simulation of calls is achieved with the use of virtual agents that mimic the behavior of human agents that ordinarily deal with caller enquiries in a contact center (120). A set of virtual agents, which can mirror their human counterparts, can be generated and assigned activities and behaviors that simulate the behavior of human agents. These virtual agents can thus be enlisted in testing campaigns placed within the contact center (120), and assigned to answer calls as if they were in fact human agents, in accordance with the usual operation of the contact center environment.

8 Claims, 3 Drawing Sheets

| Name | Activity No | Predecessor(s) | Successor(s) | Min/Max Duration | AttachedData | Can be final act? |
|---|---|---|---|---|---|---|
| CallRinging | 1 | None | CallInBound NotReady | 1/36000 | n/a | N |
| CallInbound | > 1 | CallRinging CallOnHold AttachUserData | CallOnHold AttachUserData AfterCallWork NotReady | 1/36000 | n/a | Y |
| CallOnHold | > 2 | CallInBound CallOnHold | CallInBound AttachUSerData | 1/36000 | n/a | N |
| AttachUserData | > 2 | CallInBound CallOnHold | CallInBound CallOnHold | 0/0 | UserData | N |
| AfterCallWork | > 2 | CallInBound AttachUserData | NotReady | 1/36000 | Extensions | Y |
| NotReady | > 1 | CallRinging CallInBound AttachUserData AfterCallWork | None | 1/36000 | Extensions | Y |

FIG. 3

INTEGRATED TESTING PLATFORM FOR CONTACT CENTRES

FIELD OF THE INVENTION

The invention relates to contact centres and, more particularly, testing the operation of contact centres.

BACKGROUND OF THE INVENTION

Contact centres are recognised as systems with which a person communicates via telephone, typically to receive information, make a purchase, report a problem or any range of like activities. A contact centre may include one or more interactive voice response (IVR) systems that provide verbal prompts to solicit responses for automated branching of voice queries. The caller responds by pushing buttons on their telephone keypad, or by voice response. While calls to the contact centre may be entirely conducted within the IVR, callers may be transferred to a human agent. The agent talks directly to the caller, and typically interacts with a computer system to further assist the caller.

Detecting operational issues with contact centres is desirable, and such issues are desirably detected and resolved before they are noticed by callers. Poor-quality interactions can adversely affect a company's reputation and, ultimately, profits. Contact centres are often a first point of contact with callers and consequently set a first impression with callers.

Various methods and systems exist for testing IVR-based systems. One technique involves load and performance testing the IVR by generating bulk volume calls that are directed at the IVR. The test calls directed at the IVR conform to a "test script" that determines certain parameters of the test calls. There are various existing techniques for specifying a "test script" for generating calls for bulk call testing, and many techniques are proprietary to particular vendor solutions.

Contact centres that use agents introduce a human factor and are consequently less amendable to analysis. While IVR systems are intended to behave as designed, human agents are often used precisely because the caller's requirements are not predictable. Naturally, the behaviour, skills and performance of agents also vary. Techniques for testing contact centres that involve the use of human agents would thus form a welcome addition to the art.

SUMMARY OF THE INVENTION

The present disclosure provides for a system and method for operating performance of a contact centre by simulating calls in the contact centre in an automated manner. Simulation of calls is achieved with the use of virtual agents that mimic the behaviour of human agents that ordinarily deal with caller enquiries in a contact centre. A set of virtual agents, which can mirror their human counterparts, can be generated and assigned activities and behaviours that simulate the behaviour of human agents. These virtual agents can thus be enlisted in testing campaigns placed within the contact centre environment, and assigned to answer calls as if they were in fact human agents, in accordance with the usual operation of the contact centre environment.

Contact centre operation can thus be simulated by placing calls into a contact centre environment just as callers do, though in an automated manner. Virtual agents can be used to simulate the behaviour of actual agents, though in a predetermined manner. Variability in particular virtual agent behaviours can be introduced by effectively specifying a probability distribution to certain parameters. As an example, the duration of certain intervals may be assigned a minimum and a maximum duration, and the actual duration determined as a random interval with a uniform distribution between the minimum and maximum.

The progression of the actual call is recorded and the data consolidated with that of other calls so that performance can be reported and analysed in any way that may prove useful. Monitoring the operation and performance of contact centres can highlight operational issues that may require attention. Various benefits may arise from resolving such issues before callers notice them as problems.

BRIEF DESCRIPTION OF THE DRAWINGS

FIG. 3 is a table of Activity Type Rules associated with the Behaviour Activity Sequences of FIG. 2.

DETAILED DESCRIPTION

Figure 1:
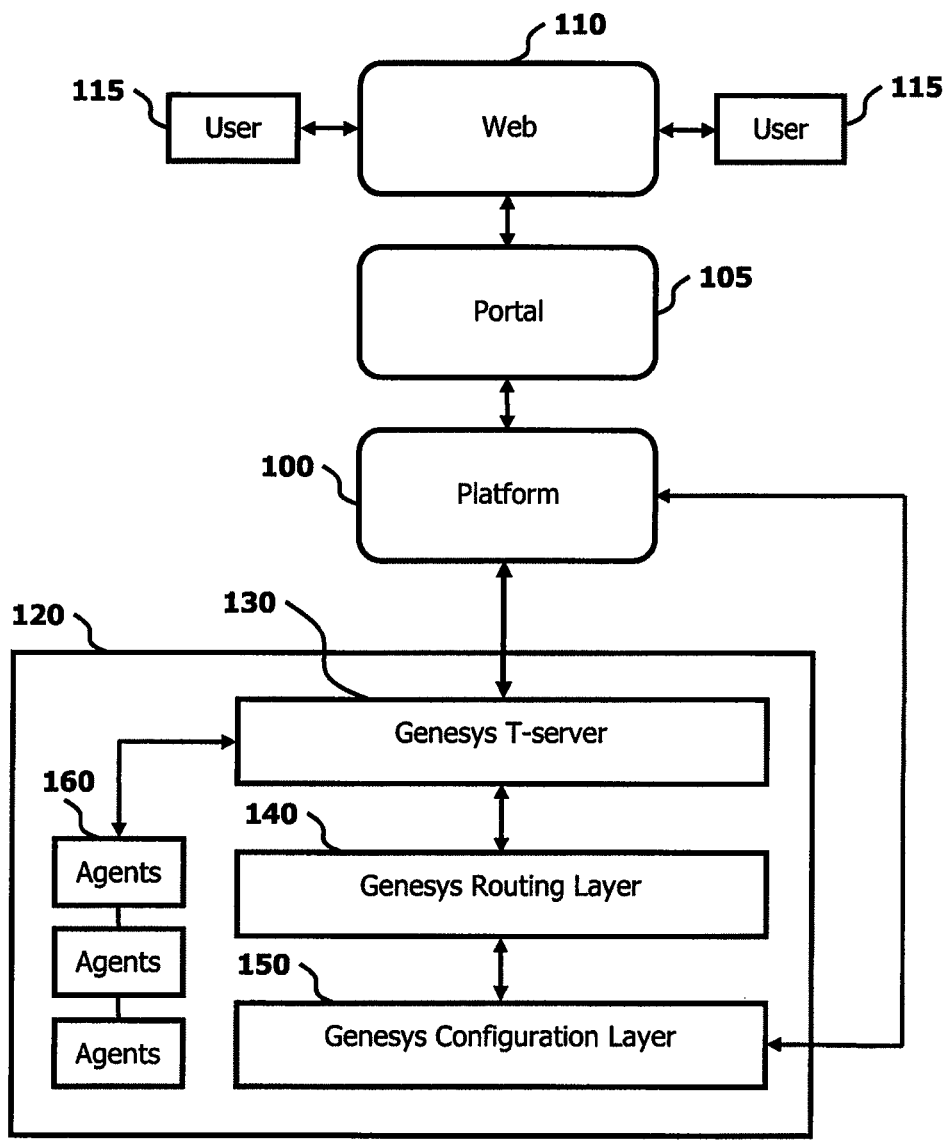
FIG. 1 is a schematic representation of an architecture for a system for testing contact centre performance.

FIG. 1 represents an architecture of a CTI system for testing contact centre performance. The system is based around a platform 100 that is accessed through a portal 105 via the web 110. The portal 110 allows users 115 to access and operate the platform for testing the contact centre 120.

The contact centre 120 operates using products supplied by Genesys Telecommunications Labs, Inc., of California, United States of America. The platform 100 as described herein is specifically designed to operate in conjunction with a Genesys environment, though can be adapted to run any analogous system. The client environment 120 incorporates a Genesys T-Server 130, a Genesys Routing Layer 140 and a Genesys Configuration Layer 150. Agents 160 that operate the contact centre are connected to the Genesys T-server 130.

Further information regarding the Genesys environment can be obtained directly from Genesys publications that deal with the Genesys Framework architecture and applications, and deployment of the Genesys architecture. As an example, a relevant publication is *Genesys Framework 7.5 Deployment Guide*, which is available through Genesys Technical Support website or Genesys *Documentation Library DVD*, and can be obtained from Genesys upon request. The content of this reference is hereby incorporated by reference.

Configuration

A Genesys Configuration Profile for the client environment 120 is utilized with the platform 100. The Genesys Configuration Profile specifies:

The Genesys Configuration Server details from which agent details are imported

The details for T-Server 130 to which the agents connect

Genesys Configuration Server details are required to import agent details from the Configuration Server as part of a Virtual Agent creation process. This information is also used to refresh Virtual Agent details on commencement of a Campaign run.

To configure a Configuration Server, the following fields are specified:

Config Server Name—A user-friendly name assigned to the Configuration Server. This value is used only for display purposes and does not affect the operation of the solution.

Hostname/IP—The hostname configured in the DNS or the IP address of the host system where Configuration Server resides.

Port—The port on the host on which Configuration Server is listening for requests.

CME Application Name—The name of the application configured in Genesys Configuration Manager that is used to connect to the Configuration Server. This application should be created as part of the deployment process.

Username—The username of the Person object configured in Configuration Manager that is used for authentication when connecting to Configuration Server. This Person object should be created as part of the platform deployment process.

Password—The password for the Person object used for authentication.

Genesys T-Server configurations for the Genesys environment are defined in the platform 100. Once T-Servers configurations are defined, these configurations are available for selection as part of the Virtual Agent creation process, as described in further detail below. At least one T-Server configuration must be defined and assigned to one or more agents in order to run a Campaign.

To define a T-Server configuration the following fields are specified:

T-Server Name—A user-friendly name assigned to the T-Server 130. This value is used only for display purposes and does not affect the operation of the solution.

Hostname/IP—The hostname configured in the DNS or the IP address of the host system where T-Server 130 resides.

Port—The port on the host on which T-Server 130 is listening for requests.

An existing T-Server configuration can be updated or edited as required. All dependent Virtual Agents-T-Server relationships are updated with the new details.

Behaviours

One or more Behaviours are defined before creating Virtual Agents and running Campaigns. A Behaviour specifies how a Virtual Agent handles an interaction and consists of an ordered sequence of Activities to be performed by the Virtual Agent for each interaction received (for example, an inbound call).

This section defines the general attributes of the Behaviour. Enter the following information to create the new Behaviour:

Behaviour Name—Unique name for the Behaviour.

Behaviour Type—Indicates the media type of the interaction. This is by default set to 'Voice', though other interaction types are possible.

Behaviour Description—A brief description of the Behaviour.

Activities represent the individual actions to be performed by a Virtual Agent as part of the handling of an interaction. Each Activity is defined by an Activity Type, a duration, and any associated user data.

Behaviours of Virtual Agents are designed to mimic real (e.g., human) agent behaviours when dealing with interactions. Consequently, the allowable sequence of Activities that form a Behaviour is restricted to a subset of those that actually occur in a real contact centre environment. For example, the CallOnHold Activity cannot immediately follow the CallRinging Activity, as a CallInbound Activity is first required to establish the interaction. There are some simple rules defining the possible sequence and combinations of Activities. Most of these are quite intuitive, for example, CallInbound cannot precede CallRinging, CallInbound cannot follow AfterCallWork, and so on. These rules are made for the sake of convenience and practicality.

Figure 2:
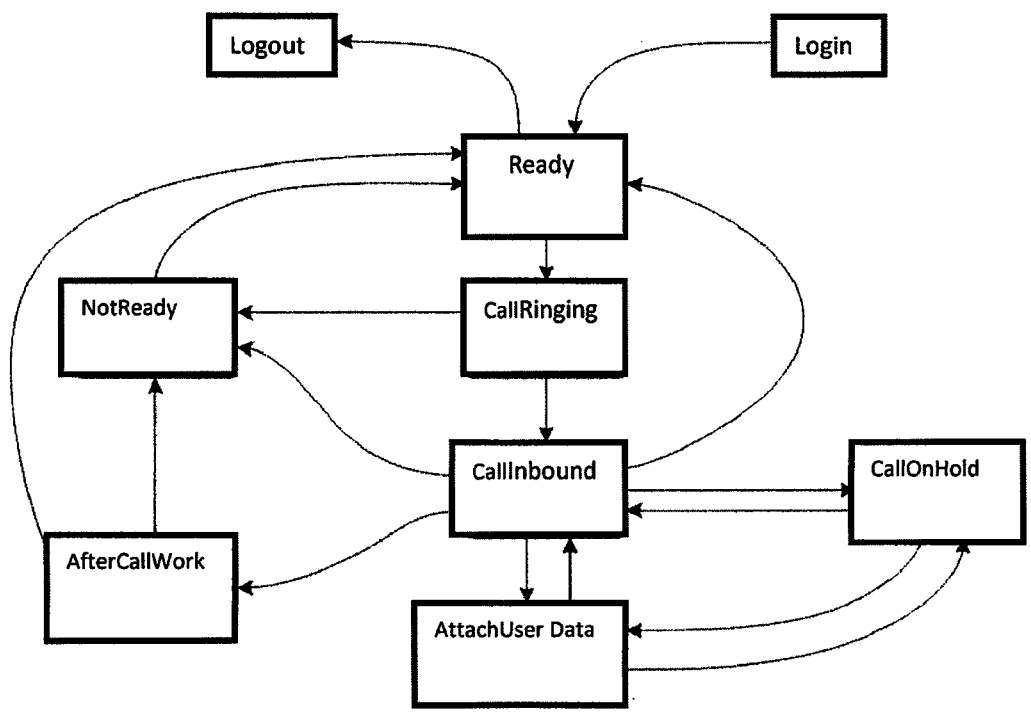
FIG. 2 is a state chart of Behaviour Activity Sequences used in testing contact centre performance.

FIG. 2 is a state chart of the behaviour activity sequence, in which each state and the flow of states is indicated as shown. The Activity sequence state chart provides a graphical representation of the allowable Activity sequences and transitions that form a Behaviour. Each Activity in the state chart shows:

The allowable Activity/Activities that can precede the Activity (predecessors).

The allowable Activity/Activities that can follow the Activity (successors).

FIG. 3 is a table that provides a related representation of the business rules that are applied to the creation of Behaviours. This table also shows additional information such as the minimum and maximum durations allowable for each Activity, and whether or not Attached Data is supported as part of the Activity.

With reference to FIGS. 2 and 3, behaviours can consist of the following Voice Activity Types:

CallRinging—Specifies how long the Virtual Agent allows an inbound call to ring before answering the call. This is selected as the first Activity by default.

CallInbound—Instructs the Virtual Agent to answer the call (if the call is ringing) or retrieve the call from hold (if the call has been held). The duration of this Activity contributes to the overall "talk time" of the call.

CallOnHold—Instructs the Virtual Agent to place the call on hold. The duration of this Activity contributes to the overall "hold time" of the call.

AttachUserData—Instructs the Virtual Agent to attach the specified Key-Value Parameters to the call in the form of User Data. This is an instantaneous (that is, zero-duration) activity.

AfterCallWork—Instructs the Virtual Agent to release any call in progress and commence after-call work for a specified duration.

NotReady—Instructs the Virtual Agent to enter Not Ready mode for a specified duration.

There is no "call release" Activity. Calls are automatically released under the following circumstances:

On completion of the CallInbound Activity, if CallInbound is the final Activity in the Behaviour.

Prior to commencing an AfterCallWork Activity.

Prior to commencing a NotReady Activity.

For voice Behaviours, a call is always initiated with a "ringing" event. Hence, 'CallRinging' is selected by default as the first 'Activity Number' and 'Activity Type'. To add an Activity to a Behaviour, the following details are specified:

Activity Number—This is a unique number assigned to each Activity and is essential as it indicates the position of the Activity within the sequence of Activities.

Activity Type—This defines the Activity to be performed by the Virtual Agent (as described above).

Min Duration—Minimum duration of time for which the Activity is performed. If different from the value specified for Max Duration, the Activity is performed for a random duration between the Min and Max Durations specified. To set a constant duration for the Activity, specify the same value for the Max Duration field.

Max Duration—Maximum duration of time for which the Activity is performed. If different from the value specified for Min Duration, the Activity is performed for a random duration between the Min and Max Durations specified. To set a constant duration for the Activity, specify the same value for the Min Duration field.

An Activity can be inserted at a particular position, and Activities can be updated as required.

The details of the Activity are populated as required.

There are some Activity types for which data can be attached in the form of Key-Value Parameters. These Activity types are:

AttachUserData
AfterCallWork
NotReady

When one of these Activities is selected, 'Key-Value Parameters' can be added to an Activity. Select one of the above-mentioned Activity types to display the 'Key-Value Parameters' section. Enter one or more pairs of key and value combinations via the portal.

Once a Behaviour is saved, it may be edited, deleted or cloned. A Behaviour cannot be deleted if it has been assigned as a 'Default Behaviour' for one or more Agents, or if it is in use in a Campaign. An error message is displayed upon attempting to delete a Behaviour that is in use. To delete a Behaviour that is currently in use, first a different Behaviour is assigned as the 'Default Behaviour' for all Virtual Agents and/or Campaigns using the Behaviour to be deleted. The clone function creates a copy of the Behaviour and simplifies the process of creating similar Behaviours and/or creating new Behaviours based on an existing Behaviour.

Virtual Agents

Virtual Agents are used in Campaigns to represent actual agents in a contact centre environment. Whilst related and dependent to a limited extent on agent (Person) objects in the Genesys Configuration Manager Environment, which may be otherwise referred to as 'Genesys Agents', Virtual Agents are stored as a physically separate data entity within the testing platform 100. Each Virtual Agent serves as a counterpart to a corresponding Genesys Agent and as such there is a one-to-one relationship between Virtual Agents and Genesys Agents. While certain applications may find a different set of Virtual Agents useful, a set of Virtual Agents corresponding to actual agents is obviously helpful when simulating the operation of the contact centre environment.

For a Virtual Agent to be imported into the platform 100, the agent needs to exist in the Genesys Configuration Manager. As Virtual Agents are used to log-in to the client environment 120.

Creating a 'New Virtual Agent' involves the following editable fields:

Employee ID—The unique employee ID of the agent to be imported. Corresponds to the 'Employee ID' property of the Genesys Agent.

Default Behaviour—Behaviour that is selected by default when the Virtual Agent is added to a Campaign.

Description (Optional)—A short description of the Virtual Agent.

The following fields are non-editable and are used to display the imported information from Genesys:

First Name—The first name of the agent as configured in Genesys Configuration Manager.

Last Name—The last name of the agent as configured in Genesys Configuration Manager.

Username—The username of the agent as configured in Genesys Configuration Manager.

Skills—The skill names and corresponding proficiencies assigned to the agent in Genesys Configuration Manager. Proficiencies (skill levels) are displayed in parentheses following the skill name.

To import a Virtual Agent, the employee ID of the Genesys Agent is entered via the portal. A default Behaviour is assigned to the Virtual Agent using the 'Default Behaviour' drop-down list. A description for the Virtual Agent is entered, and the results saved.

If Virtual Agent details are successfully retrieved from Genesys Configuration Server, these details are displayed in the relevant fields and the Virtual Agent is saved. An error message is displayed if the no agent with a matching employee ID is found.

Before a Virtual Agent can be used in a Campaign, one or more T-Server relationships must be defined for the Virtual Agent. A T-Server relationship specifies the login details to be used by the Virtual Agent when logging into a particular T-Server 130. In this way, T-Server relationships are akin to "login profiles" for a Virtual Agent—they specify what and where the Virtual Agent logs into. Each Virtual Agent may define only one relationship for each T-Server 130.

T-Server relationships are used in Campaigns to specify the login attributes of the Virtual Agent for a particular Campaign. So for example, a Virtual Agent may have two T-Server relationships defined—such as with T-Servers 130 in different sites or locations. As an example, there may be separate relationships defined for a T-Server based in Sydney, another for a T-Server based in Melbourne. Therefore, a Campaign may be created to run a simulation where the Virtual Agent logs into a Sydney T-Server, and another Campaign created to run a simulation where the Virtual Agent logs into the Melbourne T-Server. T-Server relationships may be used in more than one Campaign.

T-Server relationships may be added for T-Servers 130 that have been defined in the testing platform 100 via the portal 105. Creating T-Servers configurations in the platform 100 is described in further detail above. If no T-Server relationships are defined for a Virtual Agent, the Virtual Agent does not appear in a selection list for a Campaign.

To define a T-Server relationship for a Virtual Agent the following fields are defined:

T-Server Name—Contains a list of available T-Servers. Since only one relationship can be defined for each T-Server 130 for each Virtual Agent, only T-Servers with no existing relationship with the Virtual Agent are displayed.

DN—Directory Number to be registered for use by the Virtual Agent.

Switch Login—The Switch Virtual Agent Login configured and assigned to the agent in Genesys. Used to log the Virtual Agent into the switch/PABX.

Switch Password (Optional)—The password corresponding to the Switch Login.

Queue (Optional)—Queue that the agent logs into.

Deleting a T-Server relationship for a Virtual Agent affects existing Campaigns containing the Virtual Agent-T-Server relationship combination. Deleting a T-Server relationship that is currently used by a Virtual Agent in a Campaign removes the Virtual Agent from the Campaign. A T-Server Relationship can also be edited. All Campaigns using the updated Virtual Agents-T-Server relationship are updated with the new details.

Before deleting a Virtual Agent, verify that the Virtual Agent is no longer required for use in any Campaigns. Deleting a Virtual Agent that is currently used in a Campaign automatically removes the Virtual Agent from the Campaign.

Campaigns

Behaviours and Virtual Agents may be used in Campaigns once they have been created. Campaigns are used as the basis for simulation campaigns and define:

The duration of the simulation campaign.

The start/date time of the simulation campaign.

Volume of calls generated during the course of the campaign.

The Virtual Agents included in the simulation campaign.

The Behaviour assigned to each Virtual Agent for the simulation campaign.

The T-Server relationship to be used for each agent for the simulation campaign.

Campaigns thus provide the flexibility to build simulations for a wide-range of scenarios and/or operational conditions within a client environment 120.

The general attributes of the Campaign are as follows:

Campaign Name—Unique name for the Campaign.

Description—A brief description of the Campaign.

Last Run—The date and time when the Campaign was last run. This field is not editable.

Current Status—This field displays the current run status of the Campaign and is not editable-valid values are:
  Aborted—the Campaign has been aborted by a user
  Running—the Campaign is currently in progress
  Queued—the Campaign has been queued and scheduled to run at a future date/time
  Completed—the Campaign run has completed successfully
  Internal Error—a system error has occurred when trying to start or abort the Campaign, or during the execution of the Campaign Run Active Status—Indicates if the Campaign is active. An inactive Campaign can be saved, but not scheduled or run.

Run For—Duration of the Campaign run in minutes.

Run Date—A date and time to run the Campaign.

Only Virtual Agents with T-Server relationships defined are available for selection for use as part of a Campaign. To include a Virtual Agent in the Campaign, a Behaviour is assigned to the Agent from a Behaviour drop-down list that is used for the Campaign. The Agent's default Behaviour is selected by default. A T-Server 130 is selected that the Virtual Agent logs into for the Campaign. The login details specified in the T-Server relationship for the Virtual Agent are used.

To create and run a Campaign, a Campaign name is created, a valid plan is selected and a description for the Campaign is selected. The 'Active Status' of the Campaign is set to 'Active'. The duration of the Campaign run is specified in the 'Run For' field. A date and time for the Campaign to be run is specified using the 'Requested Run Date' or 'Scheduled Run Date' fields. The Agents and associated Behaviours and T-Servers to be used in the Campaigns selected from the 'Agents/Behaviour' section. If the requested/scheduled run date is set to a date/time in the future, the Campaign is queued, or if set to the current date/time or a date/time in the past, the Campaign is started immediately.

Campaigns can be edited, deleted and searched. Running campaigns can also be aborted, and scheduled campaigns can be removed from the queue.

Reporting

An advantage of the testing platform 100 is that it enables simulation of a contact centre environment 120, consequently providing insight into its operation and the ability to analyse the results of Campaign runs through reporting capabilities. There are two major categories of reporting available—Real-time reports and Historical reports.

Real-time reports provide dynamically updated information and statistics on Campaigns that are in progress. When there are one or more Campaigns running, the 'Virtual Agent Status' report is enabled. Historical reports provide information and statistics on all Campaigns that have been executed in the past and include the following reports:

Call Distribution Report
Caller Type Handled by Virtual Agent Report
Campaign Calls Report
Virtual Agent Activity Report Historical reports are predominantly provided in the form of summary reports containing aggregated performance metrics, with the ability to drill-down to data for individual Virtual Agents, interactions and activities. As historical data is stored for all Campaign runs, historical reports for different Campaign runs can be used to compare different "what-if" scenarios and varying contact centre environments and/or conditions. It is also possible to view historical reports for Campaigns that are currently in progress, however, the data contained within the reports is not dynamically updated and the report has to be reloaded to retrieve the most up-to-date data.

Real-time reports are available for all Campaign runs that are currently in progress, and an associated snapshot is available, indicating key information.

For each Campaign, a Real-Time report indicates:

Campaign Name—The name of the in-progress Campaign.

Date Run—The date and time when the Campaign commenced.

Calls Received—Snapshot of the number of calls received by Virtual Agents in the Campaign.

% Complete—Percentage of the Campaign completed relative to the overall Campaign duration.

Status—The current status of the Campaign.

To view a Real-Time report for a Campaign that is currently in progress, select a report type, for example, a Virtual Agent Status Report. The Virtual Agent Status Report provides real-time updates of the progress of a running Campaign. This Virtual Agent Status Report shows the current state of each Virtual Agent in the Campaign and associated statistics. The Virtual Agent Status Report allows you to monitor the performance of a simulation as it progresses to ensure that the Campaign is running as expected.

The Virtual Agent Status Report contains the following summary information for the Campaign:

Campaign Name—The name of the Campaign.

Duration—Overall duration of the Campaign.

No. of Calls—The total number of calls received by Virtual Agents, which is incremented when an Agent commences an interaction.

% Completed—Provides a visual indicator of the progress of the Campaign as a percentage completed relative to the overall run duration.

For each Virtual Agent, the following information and statistics are provided:

State Icon—Provides a pictorial representation of the current Virtual Agent state.
  After-Call Work
  Call Inbound
  Logged-out
  Not Ready/Error
  Ringing
  Wait For Next Call (Ready)

Virtual Agent Name—The name of the Virtual Agent in 'Last Name, First Name' format.

Current State—Visual and textual representation of the current Virtual Agent State:
  After-Call Work—Virtual Agent is performing follow-up work in relation to the previously completed interaction.
  Call Inbound—Virtual Agent is handling an inbound call.

Hold—Virtual Agent has placed the call on hold.

Logged-out—Virtual Agent is not logged into the system.

Not Ready—Virtual Agent is in Not-Ready mode and unable to receive inbound interactions.

Ringing—Inbound call is being presented to the Virtual Agent.

Ready (WaitForNextCall)—Virtual Agent is available and ready to receive inbound interactions.

Error—Virtual Agent is in an error state for CCM. Occurs when an error event is received from CTI for the Virtual Agent.

Duration—The elapsed time, expressed as 'hh:mm:ss', indicates that the Virtual Agent has spent in its current state.

Calls Received—The total number of calls received by Virtual Agents. Incremented when a Virtual Agent commences an interaction.

Skills—Comma-separated list of skills assigned to the Virtual Agent in Configuration Manager at commencement of the Campaign. The list of skills is truncated if the list length exceeds the column width.

Behaviour—The Behaviour assigned to the Virtual Agent for the Campaign.

Historical reports are available for all past Campaign runs, as well as Campaign runs that are currently in progress. A list is displayed of all past and in-progress Campaign runs in order of descending run date and time. By default, only Campaign runs within the last seven days are displayed, though to display reports for a larger date range, a filter function can be used as described below.

For each Campaign, Historical Reports indicate:

Campaign Name—The name of the Campaign.

Date Run—The date and time when the Campaign run commenced.

End Date—The date and time when the Campaign run was completed or aborted.

No. of Virtual Agents—Total number of Virtual Agents participating in the Campaign run.

Total Calls—The total number of calls received by Virtual Agents. Incremented when a Virtual Agent commences an interaction.

Run Result—The overall result of the Campaign run. Can be one of 'Aborted', 'Success', 'Fail' or 'Internal Error'.

To view a Historical report for a Campaign run a report type is selected. The following report types are available:

Call Distribution Report

Caller Type Handled by Virtual Agent Report

Campaign Calls Report

Virtual Agent Activity Report

To better manage the potentially large number of Campaign runs displayed in the historical reporting screen, the Web Portal provides a filtering function to restrict the range of Campaign runs displayed to a specified date range. To filter the Campaign list to a specific date range, date and time ranges can be selected using 'From' and 'To' fields or using the calendar controls. Dates selected are inclusive.

A 'Call Distribution Report' provides a summary of the distribution of inbound calls processed across the Agents in the Campaign run. It is useful in determining if the appropriate Virtual Agents are being targeted correctly by the routing strategy. The top section of the report shows the following Campaign run summary information:

Campaign Name—The name of the Campaign.

Number of Virtual Agents—Total number of Virtual Agents in the Campaign run.

Date Run—The date/time range when the Campaign run commenced and ended.

No. of Calls—The total number of calls received by Virtual Agents.

Result—The overall result of the Campaign run. Can be one of 'Aborted', 'Success', 'Fail' or 'Internal Error'.

For each Virtual Agent, the Call Distribution Report shows:

Virtual Agent Name—Name of the Virtual Agent.

Calls—The number of calls received by the Virtual Agent for the Campaign run.

% Distributed—Calls received as a percentage of the total calls received for the Campaign run.

Average Handle Time—Average handling time for calls processed by the Virtual Agent.

Once in the 'Call Distribution Report', one can drill-down to additional reports to view more detail. A 'Calls Handled by Agent Summary Report' is accessible by drilling-down from the 'Call Distribution Report' and shows a summary of all calls handled by a particular Virtual Agent. To view this report, select the number of calls received for a Virtual Agent ('# Calls' column). The report is split into three sections—Campaign information, Virtual Agent information and Call summary.

The Campaign information section shows:

Campaign Name—The name of the Campaign.

Number of Virtual Agents—Total number of Virtual Agents in the Campaign run.

Date Run—The date/time range when the Campaign run commenced and ended.

No. of Calls—The total number of calls received by Virtual Agents.

Result—The overall result of the Campaign run. Can be one of 'Aborted', 'Success', 'Fail' or 'Internal Error'.

The Virtual Agent information section shows:

Virtual Agent Name—The name of the Virtual Agent that received the calls.

DN—The Directory Number used by the Virtual Agent to receive the calls.

Applied Behaviour—The Behaviour used by the Virtual Agent in handling calls for the Campaign run.

No. of Calls—The total number of calls received by the Virtual Agent.

Skills—Comma-separated list of skills and corresponding proficiencies (in brackets) assigned to the Virtual Agent in Configuration Manager at commencement of the Campaign. The list of skills is truncated if the list length exceeds the column width.

All calls received for the Virtual Agent are displayed in summary format in the order in which calls were received by the Virtual Agent. For each call, the report shows:

Call no.—The call number received by the Agent (for example, '3' indicates the third call received by the 'Virtual Agent').

Start Time—The time when the call commenced. This corresponds to the time when a ringing event is first received for the call.

End Time—The time when the call terminated. This corresponds to the time when a released event is received for the call.

Duration—The duration of the call. Defined as the duration between a ringing event and released event for the call.

Ring Time—The duration for which the call was ringing.

Talk Time—The total duration that the Virtual Agent spent talking on the call. This is a summation of all Agent 'talk' states.

Hold Time—The total duration which the Virtual Agent placed the call on hold. This is a summation of all Virtual Agent 'hold' states.

ACW—The total duration of After-Call work for the call.

Caller Type—displays the type of the caller from which the call originated, which is applicable when call-linking occurs between different campaign types.

This report is accessible by drilling-down from the 'Calls Handled by Agent Summary Report' and displays transaction-level detail for a particular call. All Activities performed by the Virtual Agent on the call are shown along with statistics for each Activity. To view this report, select a call, by call number. The report shows:

Virtual Agent Name—The name of the Virtual Agent that received the calls.

DN—The Directory Number used by the Virtual Agent to receive the calls.

Applied Behaviour—The Behaviour used by the Virtual Agent in handling calls for the Campaign run.

No. of Calls—The total number of calls received by the Virtual Agent.

Skills—Comma-separated list of skills and corresponding proficiencies (in brackets) assigned to the Virtual Agent in Configuration Manager at commencement of the Campaign. The list of skills is truncated if the list length exceeds the column width.

Interaction ID—The unique identifier assigned to the call by the Genesys environment.

For each Activity, the report shows:

No.—The sequence number of the Activity for the call.

Time—The date and time when the Activity commenced.

State Icon—Provides a pictorial representation of the current Virtual Agent state.
   After-Call Work
   Call Inbound
   Logged-out
   Not Ready/Error
   Ringing
   Wait For Next Call (Ready)

Activity Name—The name of the Activity that was performed.

Duration—The duration of the performed Activity.

Attached Data—Displays the key-value pairs attached to the call by the Virtual Agent as part of the Activity.

The 'Caller Type Handled by Virtual Agent Report' shows a summary of all caller types handled by a particular Virtual Agent when call-linking is enabled between the different campaign types offered by the platform 100. Call-linking provides end-to-end tracking of each call placed from the platform 100, which enables you to link individual caller types to the Virtual Agents that handled the call. The Campaign information section shows:

Campaign Name—The name of the Campaign.

Number of Virtual Agents—Total number of Virtual Agents in the Campaign run.

Date Run—The date/time range when the Campaign run commenced and ended.

No. of Calls—The total number of calls received by Virtual Agents.

Result—The overall result of the Campaign run. Can be one of 'Aborted', 'Success', 'Fail' or 'Internal Error'.

For each Virtual Agent, the 'Caller Type Handled by Virtual Agent Report' shows:

Virtual Agent Name—Name of the Virtual Agent in 'Last Name, First Name' format.

Calls—The number of calls received by the Virtual Agent for the Campaign run.

% Distributed—Calls received as a percentage of the total calls received for the Campaign run.

Caller Type—Used when call-linking is enabled between the different Campaign types. If enabled, displays the type of the caller (as defined by its respective Campaign) from which the call originated.

The 'Campaign Calls Report' is similar to the 'Calls Handled by Virtual Agent Summary Report', but shows a summary of all calls received for the Campaign run. Calls are displayed in ascending order of arrival by default.

The Campaign information shows:

Campaign Name—The name of the Campaign.

Number of Virtual Agents—Total number of Virtual Agents in the Campaign run.

Date Run—The date/time range when the Campaign run commenced and ended.

No. of Calls—The total number of calls received by Virtual Agents.

Result—The overall result of the Campaign run. Can be one of 'Aborted', 'Success', 'Fail' or 'Internal Error'.

For each call, this Report shows:

Call no.—The call number received as part of the Campaign run (for example, '3' indicates the third call received during the Campaign run).

Virtual Agent Name—Name of the Virtual Agent in 'Last Name, First Name' format.

Start Time—The time when the call commenced. This corresponds to the time when a ringing event is first received for the call.

End Time—The time when the call terminated. This corresponds to the time when a released event is received for the call.

Duration—The duration of the call. Defined as the duration between a ringing event and released event for the call.

Ring Time—The duration for which the call was ringing.

Talk Time—The total duration for which the Virtual Agent spent talking on the call. This is a summation of all Virtual Agent 'talk' states.

Hold Time—The total duration which the Virtual Agent placed the call on hold. This is a summation of all Virtual Agent 'hold' states.

ACW—The total duration of After-Call work for the call.

Caller Type—Used when call-linking is enabled between different Campaign types. If enabled, displays the type of the caller (as defined in its respective Campaign type) from which the call originated.

The 'Virtual Agent Call Activity Detail Report' described above is also accessible by drilling-down from the 'Campaign Calls Report'. To view this report, select a particular call number. For information on the 'Virtual Agent Call Activity Detail Report', refer to Agent Call Activity Detail Report described with reference to the Call Distribution Report.

The 'Virtual Agent Activity Report' provides a summary report of Virtual Agents in the Campaign run. It serves as an entry point to facilitate drilling-down to view Activities for individual Virtual Agents.

The report Campaign summary shows:

Campaign Name—The name of the Campaign.

Number of Virtual Agents—Total number of Virtual Agents in the Campaign run.

Date Run—The date/time range when the Campaign run commenced and ended.

No. of Calls—The total number of calls received by Virtual Agents.

Result—The overall result of the Campaign run. Can be one of 'Aborted', 'Success', 'Fail' or 'Internal Error'.

For each Virtual Agent, the report shows:
Virtual Agent Name—The name of the Virtual Agent that received the calls.
Calls—The total number of calls received by the Virtual Agent.
Skills—Comma-separated list of skills and corresponding proficiencies (in brackets) assigned to the Virtual Agent in Configuration Manager at commencement of the Campaign.
Behaviour—The Behaviour used by the Virtual Agent in handling calls for the Campaign run.

An 'Individual Virtual Agent Activity Report' is accessible by drilling-down from the 'Virtual Agent Activity Report' and displays transaction-level detail for all Activities performed by a Virtual Agent over the duration of the Campaign run. All Activities performed by the Virtual Agent for the Campaign run are listed in order in which they were performed, along with statistics for each Activity. To drill-down to this report, select a Virtual Agent name in the 'Virtual Agent Name' column of the 'Virtual Agent Activity Report'.

The 'Individual Virtual Agent Activity Report' indicates:
Virtual Agent Name—The name of the Virtual Agent that received the calls.
DN—The Directory Number used by the Virtual Agent to receive the calls.
Applied Behaviour—The Behaviour used by the Virtual Agent in handling calls for the Campaign run.
No. of Calls—The total number of calls received by the Virtual Agent.
Skills—Comma-separated list of skills and corresponding proficiencies (in brackets) assigned to the Virtual Agent in Configuration Manager at commencement of the Campaign.

For each Activity, the report shows:
No.—The sequence number of the Activity for the Virtual Agent.
Time—The date and time when the Activity commenced.
State Icon—Provides a pictorial representation of the current Virtual Agent state.
After-Call Work
Call Inbound
Logged-out
Not Ready/Error
Ringing
Wait For Next Call (Ready)
Call No.—The sequence number of the call handled by the Virtual Agent for the Campaign run. This field is blank for non-call-related agent states such as Logged Out, Not Ready, Error and Wait For Next Call (Ready).
Activity Name—The name of the Activity that was performed.
Duration—The duration of the performed Activity.

Although the disclosure has been described with reference to specific examples, it is appreciated by those skilled in the art that the disclosure may be embodied in many other forms. When creating a new Behaviour, the Behaviour Type defaults to 'Voice' to indicate the media type of the interaction. Other media types are however possible and can be accommodated by the existing architecture described herein in relation to 'Voice' media. As examples, other media interaction types may be 'Chat/Instant Messaging' or 'E-mail', which are encompassed within the scope of the invention. Other variations to embodiment described herein are also possible.

The invention claimed is:

1. A method for testing performance of a contact centre using virtual agents, the method comprising:
defining at least one behaviour profile that specifies behavioural response of a virtual agent to a call to the contact centre;
importing actual agent details from a configuration server in a contact centre environment to create the at least one behaviour profile;
registering at least one virtual agent into a contact centre server to respond to calls to the contact centre;
generating, using a call generator, calls to the contact centre to simulate actual enquiries to the contact centre;
assigning the at least one virtual agent to respond to the generated calls according to the at least one behaviour profile; and
recording details of calls handled by the at least one virtual agent, wherein the at least one virtual agent simulates the behaviour of an actual agent and in concert with the generated calls simulates operation of the contact centre.

2. The method of claim 1, wherein the at least one behaviour profile includes at least one activity to be performed by the at least one virtual agent.

3. The method of claim 2, wherein the at least one activity includes maximum and minimum durations.

4. The method of claim 1, wherein the at least one virtual agent is based upon actual agents profiled in a contact centre environment.

5. The method of claim 1, further comprising the step of creating the at least one virtual agent for a contact centre environment based upon at least one actual agent registered in a contact centre environment.

6. The method of claim 1, further comprising the step of scheduling a campaign of calls to generate the calls to the contact centre.

7. A method for testing performance of a contact centre using virtual agents, the method comprising:
defining at least one behaviour profile that specifies behavioural response of a virtual agent to a call to the contact centre;
registering at least one virtual agent into a contact centre server to respond to calls to the contact centre;
generating, using a call generator, calls to the contact centre to simulate actual enquiries to the contact centre;
assigning the at least one virtual agent to respond to the generated calls according to the at least one behaviour profile; and
recording details of calls handled by the at least one virtual agent, wherein the at least one virtual agent simulates the behaviour of an actual agent and in concert with the generated calls simulates operation of the contact center;
wherein the generated calls are scheduled for a predetermined time, interval and volume.

8. The method of claim 1, wherein the at least one virtual agent handles calls according to a schedule of the at least one behaviour profile.

* * * * *